Jan. 19, 1960

C. F. SEIBERT 2,921,664

CONVEYOR APPARATUS

Filed July 30, 1957

INVENTOR.
CHARLES F. SEIBERT
BY J. R. NELSON &
W. A. SCHAICH
ATTORNEYS

Jan. 19, 1960 C. F. SEIBERT 2,921,664
CONVEYOR APPARATUS
Filed July 30, 1957 8 Sheets-Sheet 2

Fig-2

INVENTOR.
CHARLES F. SEIBERT
BY J. R. NELSON &
W. A. SCHAICH
ATTORNEYS

Fig_3

Fig-4

Fig_5

Jan. 19, 1960

C. F. SEIBERT 2,921,664

CONVEYOR APPARATUS

Filed July 30, 1957

INVENTOR.
CHARLES F. SEIBERT
BY
J. R. NELSON &
W. A. SCHAICH
ATTORNEYS

Jan. 19, 1960

C. F. SEIBERT

2,921,664

CONVEYOR APPARATUS

Filed July 30, 1957

INVENTOR
CHARLES F. SEIBERT
BY J. R. NELSON &
W. A. SCHAICH
ATTORNEYS

Jan. 19, 1960     C. F. SEIBERT     2,921,664
CONVEYOR APPARATUS Filed July 30, 1957     8 Sheets-Sheet 8

Fig_7

INVENTOR.
CHARLES F. SEIBERT
BY J. R. NELSON +
W. A. SCHAICH
ATTORNEYS

United States Patent Office 2,921,664
Patented Jan. 19, 1960

2,921,664

CONVEYOR APPARATUS

Charles F. Seibert, Toledo, Ohio, assignor to Owens-Illinois Glass Company, a corporation of Ohio Application July 30, 1957, Serial No. 675,169

12 Claims. (Cl. 198—32)

This invention relates to improvements in conveyor apparatus, and more particularly to method and apparatus for transporting two or more rows of articles received on primary lengths of conveyor disposed side by side to single rows of articles at a selected destination.

The invention, as illustrated herein, when adapted to a glass bottle factory, provides a means and method of transporting glass containers deposited in pairs from a take-out device operating next to a glassware forming machine into a single row of bottles across the receiving apron of a lehr where the bottles are to be annealed. This being one of the objects of the invention, additional objects are:

To provide side by side primary conveyor lengths for receiving glassware to form a plurality of single file rows and transport said rows each at progressively increased lineal speeds to be later received by an endless transfer mechanism angularly disposed across the primary conveyor lengths and transferred into a single row on a secondary conveyor.

To provide a transfer mechanism in combination with primary and secondary conveyors that will receive and support bottles intercepted on a primary conveyor and shift them to unite the two or more rows of bottles thereon into a single row and with minimum of impact to the bottles.

To provide mechanism for adjusting points on the transfer mechanism with relation to articles traveling along the primary conveyors while transfer mechanism and conveyors are running.

Other objects and advantages will become apparent from the drawings, taken in conjunction with the following description.

Figure 1:
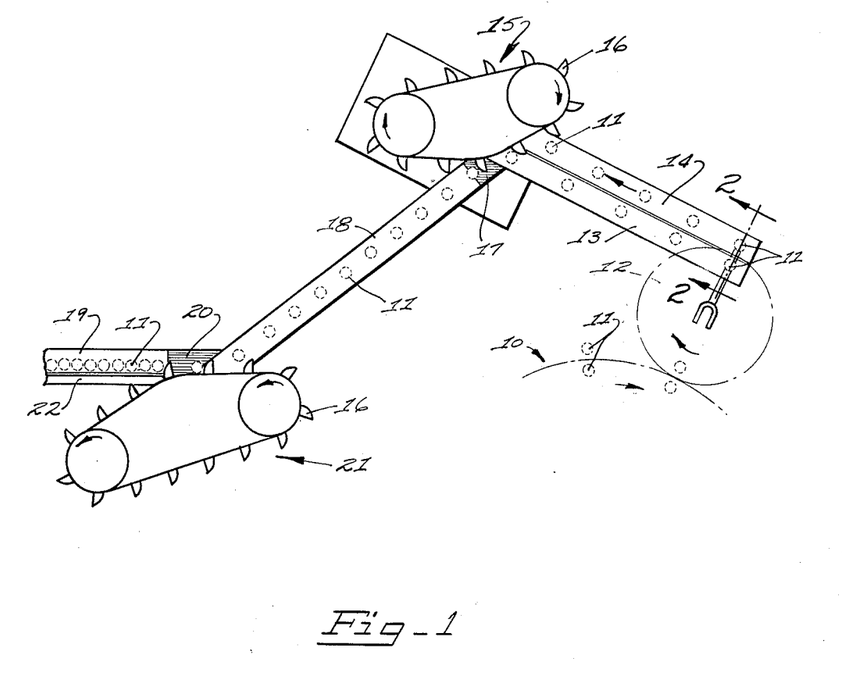
Fig. 1 is a plan view, showing the invention being utilized for transferring glass bottles deposited in pairs from a forming machine to the front edge portion of an annealing lehr apron.
Figure 3:
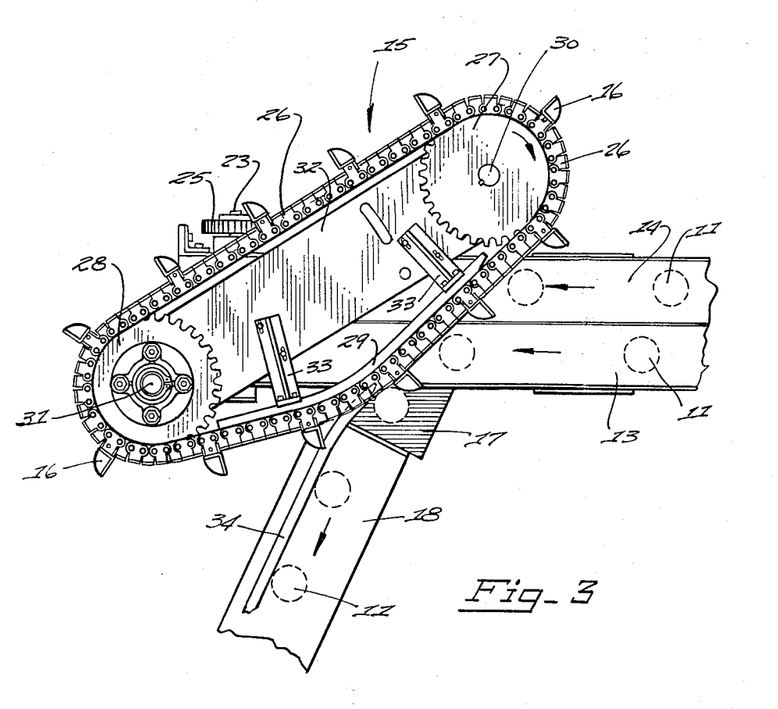
Fig. 3 is an enlarged plan view of a portion of Fig. 1, showing the primary transfer mechanism traversing the pair of primary conveyors for receiving and transferring articles therefrom onto a single secondary conveyor.

Referring to Fig. 1, the invention is shown adapted to a glass factory in which the rotating glass forming machine 10 forms a pair of glass containers or articles 11 at each station or section of the machine. A rotating transfer device, shown but schematically at 12, removes the formed containers 11 in pairs and transfers them through 180° of rotation to a point overlying a pair of primary conveyors 13 and 14, each of which are traveling in a straight line away from the point of deposit. The rotating take-out device 12 operates according to that disclosure in copending application of Russell G. Allen, Serial No. 446,043, filed July 27, 1954, entitled "Article Transfer Mechanism," and owned by common assignee. Conveyors 13 and 14 are driven to travel at different lineal speeds, so that the inner conveyor 13 travels faster than the outer conveyor 14. This differential speed is achieved by differential drive means, which will be hereinafter described. Along the length of the conveyor, at a point remote from the point where articles 11 are deposited, is located an endless transfer element 15, a length of which is guided to traverse both primary conveyors 13 and 14 at an angle obtuse to its direction of travel. The transfer element 15 has a series of spaced transfer fingers 16 along its length, the structure of which will be presently described, and the traveling articles 11 are carried against the endless transfer element 15 and propelled by the transfer fingers 16 as it travels across both conveyors 13 and 14. Adjacent the side of primary conveyor 13 is a dead plate 17, referred to herein as the first transfer plate, providing a path for travel or articles 11 from the primary conveyors to an angularly disposed secondary conveyor 18. The secondary conveyor 18 extends to a point adjacent the entrant end of the lehr apron 19 of a conventional annealing lehr. Between the lehr apron 19 and the end portions of secondary conveyor 18 is interposed the second transfer plate 20, which is a similar dead plate to transfer plate 17.

A secondary transfer device 21 is positioned for operation near the end of secondary conveyor 18 and a length thereof travels across the end of secondary conveyor 18 to receive articles 11 to transfer them across dead plate 20 onto lehr apron 19 in a closed single file. The secondary transfer mechanism 21 is an endless element having transfer fingers 16.

In overall operation, the articles 11 are deposited in pairs, as shown on Fig. 1, onto the primary conveyors 13 and 14, which are traveling at different lineal speeds. As illustrated on the drawings, due to the angular travel of transfer element 15, primary conveyor 13 travels at a greater speed than primary conveyor 14 in order to place the deposited pair of articles 11 between the transfer fingers 16 of the primary transfer element 15 approximately the same time. After the articles 11 have reached and made contact with the transfer element 15, so as to be intercepted by them, they are shifted laterally across their primary conveyors, the first transfer plate and onto the secondary conveyor. In this process, the two rows of articles 11 are thereby united into a single row traveling along conveyor 18. The articles 11 are then removed from the other end of the secondary conveyor 18 by the endless transfer element 21, shifted across second transfer plate 20 and into the closely spaced row on lehr apron 19. Periodically, whenever the row of articles extends across the end of lehr apron 19, they are moved into the lehr by pusher bar 22 which shifts the entire row of articles onto the mat of the traveling lehr (not shown).

Referring now to Figs. 2–7, the structural features of the conveyor apparatus will be described.

Figure 2:
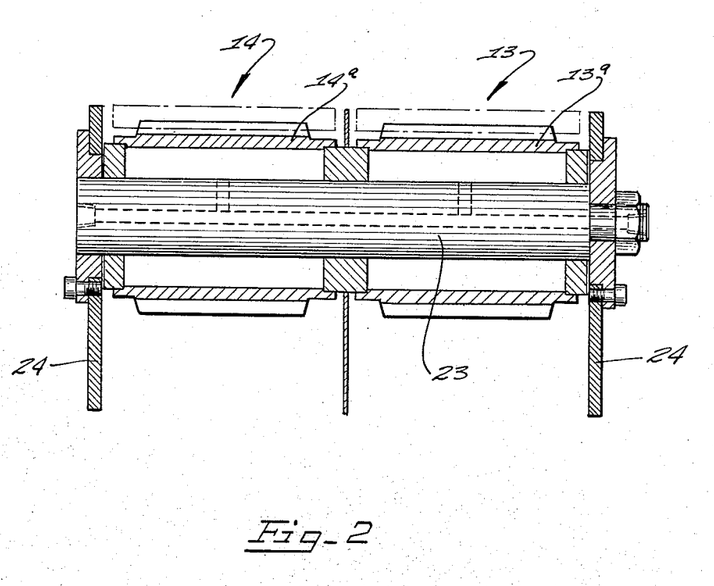
Fig. 2 is a sectional elevational view, showing the driving end portion of the pair of primary conveyors.

Fig. 2 shows, in cross section, the primary conveyors 13 and 14 at their idler end or the end where articles 11 are deposited by take-out 12 (Fig. 1). The traveling portion of the conveyors 13 and 14 are endless and are run over the teeth of gears 13a and 14a. These gears 13a and 14a are mounted for rotation on shaft 23 which is end supported at frame 24. At the idler end of the conveyors 13 and 14 (Fig. 2), the gears 13a and 14a are of the same size.

Figure 6:
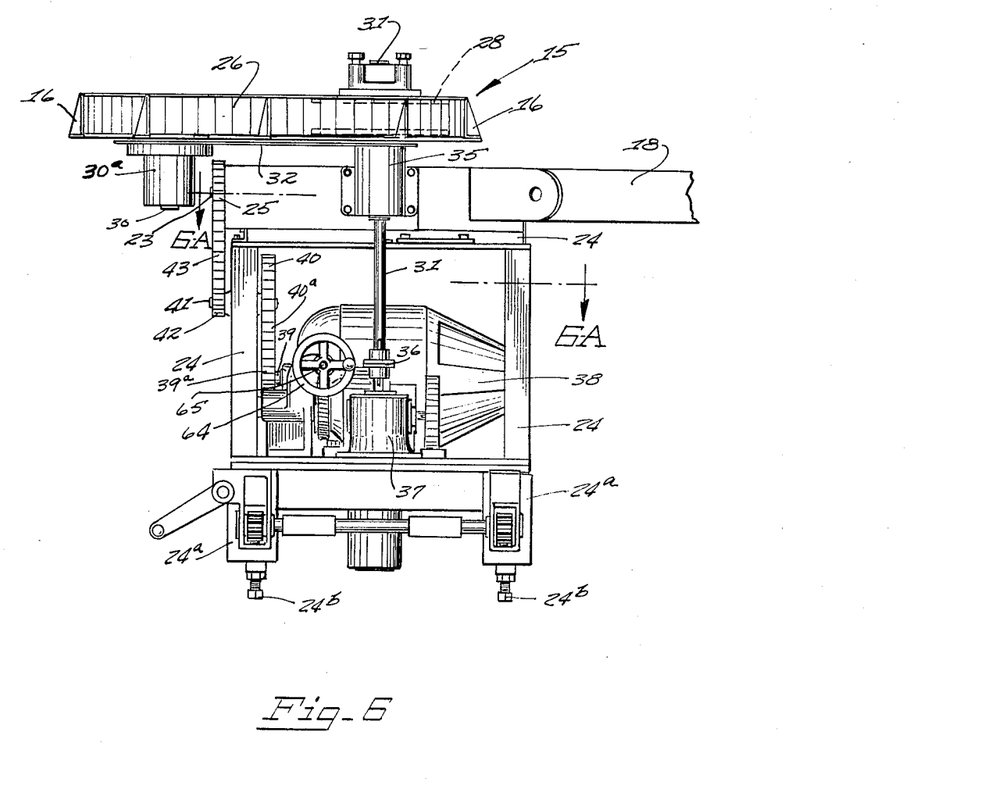
Fig. 6 is an end elevational view of the primary transfer mechanism, shown on Fig. 5.

Referring now to Fig. 2 and Fig. 6, the drive connection for the primary conveyors 13 and 14 may be demonstrated as follows. Inasmuch as the driving end and the idler end of the primary conveyors 13 and 14 are very similar in construction and would appear on drawings to be almost identical in cross-section, the driving end will be described with reference to Fig. 2, and from such description the differences of construction between the two ends of the conveyors should be readily understood by a skilled mechanic.

The cross section through the driving end of the said primary conveyors appears similar to the sectional view shown in Fig. 2, with the exception that driving gear 25 (Fig. 6) is mounted at the outer end of shaft 23 mounting gears 13a and 14a, and gears 13a and 14a at the driving end of the primary conveyors are of slightly different size one from the other. However, the gears of the same type as 13a and 14a at the drive end of the conveyors achieve the differential in traveling speed of the conveyors by having a difference of diametrical pitch, the gear 13a thus being slightly larger in diameter. However, since gear 13a need be but very slightly larger than gear 14a, as is mentioned more specifically by way of example stated hereinafter, and due to the fact that the driving end of the primary conveyors is located beyond or remote from the point of transfer being effected by the primary transfer element 15 (see Fig. 3), the upper span of primary conveyors 13 and 14 both travel, as a practical matter, at the same elevation. Any variation between the elevations of the two upper conveyor spans is so slight that it has no effect upon the bottles being shifted across them from one to the other during transfer by the primary transfer element 15. These driving gears are keyed to the shaft 23 for rotation therewith.

For the purpose of advancing one deposited article ahead of its companion article, it has been found that satisfactory advance may be achieved by having the gear mountings 13a and 14a at the driving end of the primary conveyors with 49 and 48 teeth, respectively. By the gear 13a at the driving end of conveyor 13 having one additional tooth, its rotation received from the common driving shaft mounting both gears will travel the mat of conveyor 13 at sufficiently faster speed than the mat of conveyor 14. It is recognized that other drive combinations are available in commercial devices for attaining this differential speed between the two conveyors 13 and 14.

Referring now to Figs. 3, 6, 6A and 6B, the primary transfer element 15 and its driving mechanism will be described.

In Fig. 3, the primary transfer element comprises an endless chain belt 26 mounted to run on sprockets 27 and 28 and guide member 29 in overlying relationship to primary conveyors 13 and 14 and first transfer plate 17. Sprockets 27 and 28 are mounted, respectively, on vertical shafts 30 and 31 which are held in spaced relationship by frame 32. Guide member 29 is bolted to frame 32 by brackets 33. The transfer fingers 16 are mounted to project outwardly on transfer chain 26 at equally spaced distances, the mountings forming a link coupled integrally and operatively in the make-up of transfer chain 26. Underlying the transfer chain 26, but in overlying relationship to secondary conveyor 18, is a guide rail member 34 which aligns the transferred articles 11 centrally upon the secondary conveyor 18.

In Fig. 6, it is seen that sprocket 28 is the driving sprocket and its shaft 31 extends vertically downwardly through a bushing member 35 bolted to the primary conveyor frame 24. Shaft 30 carrying sprocket 27 which is the idler sprocket (Fig. 3) is mounted for rotation in the journal member 30a of the frame 32.

Vertical shaft 31 extends downwardly from bushing in frame 32 to a coupling 36 connecting it with the power output shaft of a gear box unit 37 receiving driving rotation from electric motor 38. This drive connection will be presently described with reference to Fig. 6A.

Electric motor 38 is the receiver motor of a conventional synchro-tie electric motor drive system. The receiver motor receives its speed regulation by an electrical coupling with a transmitter motor (not shown) driven by the main drive motor of the rotating forming machine 10 (Fig. 1). By this drive connection through the synchro-tie system, the speed of motor 38 is synchronized with the speed of rotation of the main forming machine 10. The rate at which the containers are deposited by the take-out 12 onto the primary conveyors 13 and 14 establishes the minimum lineal speed of the conveyors and associated apparatus. This motor 38 is connected to drive the primary conveyors 13 and 14 and also through a gear train, drives the transfer chain 26 of the endless transfer element 15. The conveyor frame 24 rests on an adjustable mounting 24a which rests on the factory floor on studs 24b. This end portion of the primary conveyor may be adjusted vertically to level the primary conveyor bed.

Figure 6A:
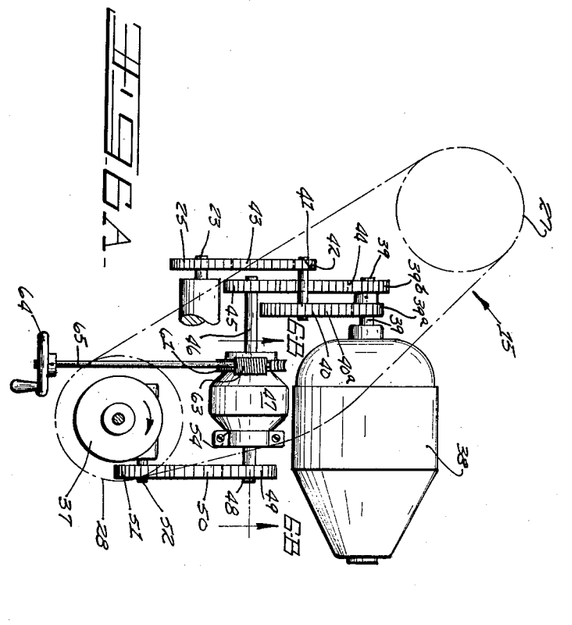
Fig. 6A is a plan view, taken along lines 6A—6A of Fig. 6.

Referring to Fig. 6A, it is seen that the motor 38 has a drive shaft 39 mounting a drive sprocket 39a which transmits torque to a sprocket 40 through chain 40a. Sprocket 40 is mounted on the shaft 41 which is mounted for rotation on frame 24 (Fig. 6). The other end of shaft 41 has a driving gear 42 making a driving connection with the driving sprocket 25 mounted on shaft 23 by a chain 43 for imparting clockwise rotation to the drive gears 13a and 14a of the conveyors 13 and 14.

The drive connection between the motor 38 and the primary transfer element 15 will now be described. The drive shaft 39 on motor 38 has a second drive pinion 39b outwardly of the previously described pinion 39a driving the primary conveyors 13 and 14. This drive sprocket 39b transmits power through chain drive 44 with sprocket 45 mounted on a horizontal shaft 46. Shaft 46 enters differential gear reduction unit 47 which transmits power from shaft 46 to an opposite shaft 48 mounting a sprocket 49. The drive connection through chain 50 transmits power from gear 49 to gear 51 of gear box unit 37. The driven gear 51 is mounted on the power input shaft 52 of the gear box unit 37. Vertical shaft 31 is the output shaft of the gear box unit 37 and is driven in a clockwise direction from similar rotation of the input shaft 52. The gear box unit 37 is a conventional unit for transferring power applied at a horizontal shaft to a vertical shaft.

Figure 6B:
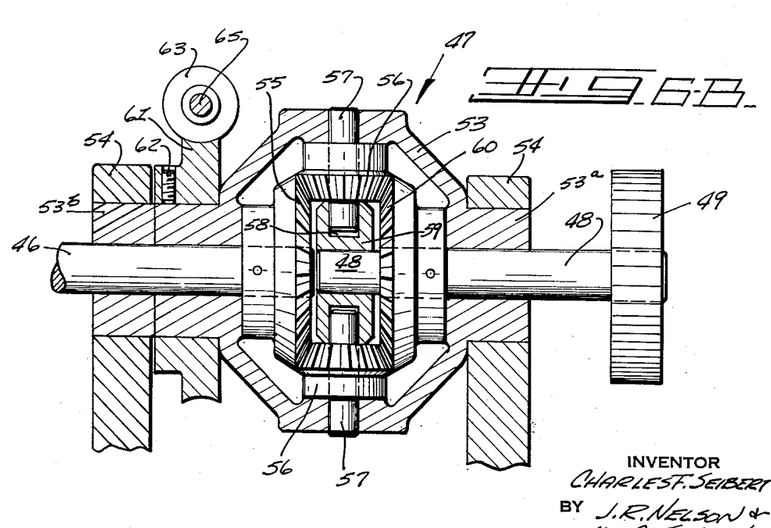
Fig. 6B is a sectional elevational view, taken along lines 6B—6B of Fig. 6A, showing the adjustable differential drive unit for advancing or retarding position of the endless transfer belt and its transfer fingers.

In Fig. 6B, the differential gear reduction unit 47 has a housing 53 that is trunnion mounted at its end portions 53a and 53b in journals of a stationary frame 54 bolted to the floor mounting 24a. The power input shaft 46 is mounted for rotation in end portion 53b of housing 53 and has a bevelled drive gear 55 keyed at its innermost end. The bevelled driving gear 55 meshes with a pair of bevelled idler gears 56 spaced 180° apart on gear 55. The idler gears 56 are each mounted on a shaft 57 and similarly journaled for rotation in the housing 53. The innermost ends of shaft 57 fit into bores 58 of a spacer member 59. Member 59 receives the innermost end of shaft 48 which is allowed to rotate therein. Shaft 48 has a bevelled driven gear 60 mounted at its end that meshes with idler gears 56. Thus, power is transmitted through the differential gear reduction unit 47 by rotation of the power input shaft 46 and its bevelled gear 55. The bevelled idler gears 56 in turn are rotated about their shafts 57. Normally the housing 53 is held stationary by having pinion 61 rigidly connected to the end portion 53b of housing 53 through set screw 62. The trunnion mounted housing 53 is capable of independent rotation through rotation of worm gear 63 in mesh with pinion 61. Worm gear 63 is rotated by turning manually turning wheel 64 on horizontal shaft 65 (see Figs. 6 and 6A).

While housing 53 is held stationary, rotation of shaft 46 transmits power by a constant rotation ratio to shaft 48. If, however, worm gear 63 is rotated in one direction so as to impart rotation to housing 53 through pinion 61, the housing 53 will impel the idler gears 56 in a direction to either advance or retard the rotation of shaft 48 which is transmitting power to the transfer element 15 through its drive gear 28. Thus, for example, if shaft 46 is turning clockwise (Fig. 6B), this rotation is transmitted through bevel gears 55 to idler gears 56 and, in turn, rotate the driven bevel gear 60 and its shaft 48 in the counterclockwise direction. To advance the normal rotation of shaft 48, the worm gear 63 may be turned counterclockwise by its hand wheel 64 which tends to turn the housing 53 carrying the idler gears 56 in the direction counter to the rotation of the bevel gear 55. This increases the rate of rotation of the idler gears 56 and advances the relative rotation of the driven bevel gear 60, so that the resultant rotation of the shaft 48 is advanced. On the other hand, if the shaft 48 is to be retarded, the worm gear 63 is rotated in the clockwise direction. This rotation will accordingly drive the pinion 61 and housing 53 in the same direction of rotation as bevel gear 55, so that the relative rotation between the idler gears 56 and gear 55 is decreased. Thus, the rotation of shaft 48 will be retarded over its normal rate of rotation.

This advancing or retarding of shaft 48 provides a means for advancing or retarding the relative position of the transfer fingers 16 on the transfer chain 26 with respect to the rows of bottles being delivered against chain 26 by the primary conveyors 13 and 14. If the relative speed of the shaft 48 is retarded, the resultant driving rotation of the drive sprocket 28 of the transfer element 15 is also retarded, and the transfer finger 16 tends to lag behind slightly to adjust to a new relative position for receiving the articles being advanced against the transfer chain 26. Likewise, when the rotation of the shaft 48 is advanced, the relative position of the transfer finger 16 is advanced, accordingly, through the speed up of rotation of the driving gear 28 to adjust to a new relative position for the transfer fingers 16.

Figure 4:
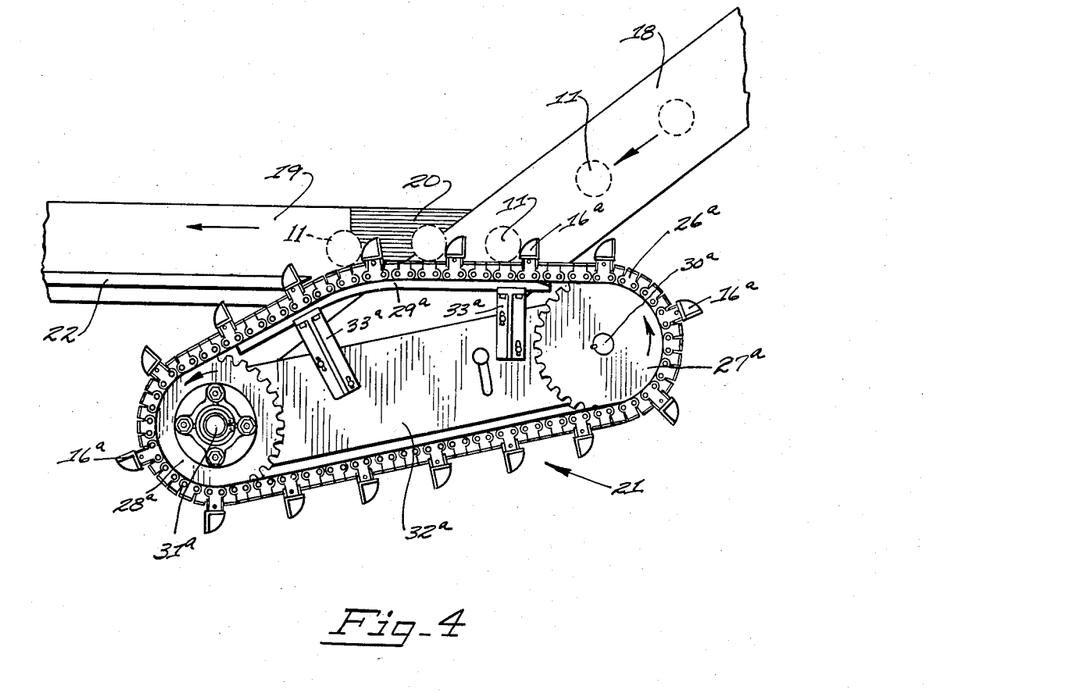
Fig. 4 is an enlarged plan view of a portion of Fig. 1, showing the secondary transfer mechanism for transferring articles in a single file row on the secondary conveyor onto the lehr apron in closed order relationship.

With reference to Fig. 4, the secondary transfer element 21 will now be described.

This secondary transfer element is similarly constructed to that previously described for the primary transfer element 15. Briefly, it consists of a transfer chain 26a, the transfer fingers 16a being mounted at equally spaced distances at links of said chain, and the transfer chain 26a running endless about spaced sprockets 27a and 28a. Sprocket 27a is mounted on a vertical shaft 30a and is the idler sprocket of the two. Sprocket 28a is mounted on a vertical shaft 31a and is the driving sprocket of the two. The shafts 30a and 31a are spaced by their mountings to frame 32a. The transfer chain 26a also runs over a guide member 29a which aligns a length of the chain with an end portion of the lehr apron 19. Guide member 29a is mounted to frame 32a by brackets 33a.

The transfer element 21 travels in a path so as to receive articles 11 traveling on secondary conveyor 18 between the transfer fingers 16a and shifts the received article 11 across second transfer plate 20 and onto the lehr apron 19. Lehr apron 19, as shown, is a conveyor, generally referred to as a lehr cross-conveyor. It is driven to move in the direction away from transfer plate 20 (see arrow thereon in Fig. 4), but at a slower rate in comparison to the rate of movement of secondary conveyor 18. As the article leaves second transfer plate 20, a contour of the guide plate 29a tends to travel away from the direction of travel of the article, and it is accordingly carried in a row ahead of the pusher bar 22. The articles 11 are moved progressively along the row formed adjacent the pusher bar 22 by travel of the lehr cross-conveyor 19. In placing the articles ahead of pusher bar 22, they are carried into, or nearly into, contact one article to another, so as to close the ranks of the articles thus being placed in a row of articles ahead of pusher bar 22. Periodically the pusher bar 22, by a reciprocating horizontal movement, loads the closely compacted row from the lehr cross-conveyor 19 onto the lehr mat (not shown).

Figure 5:
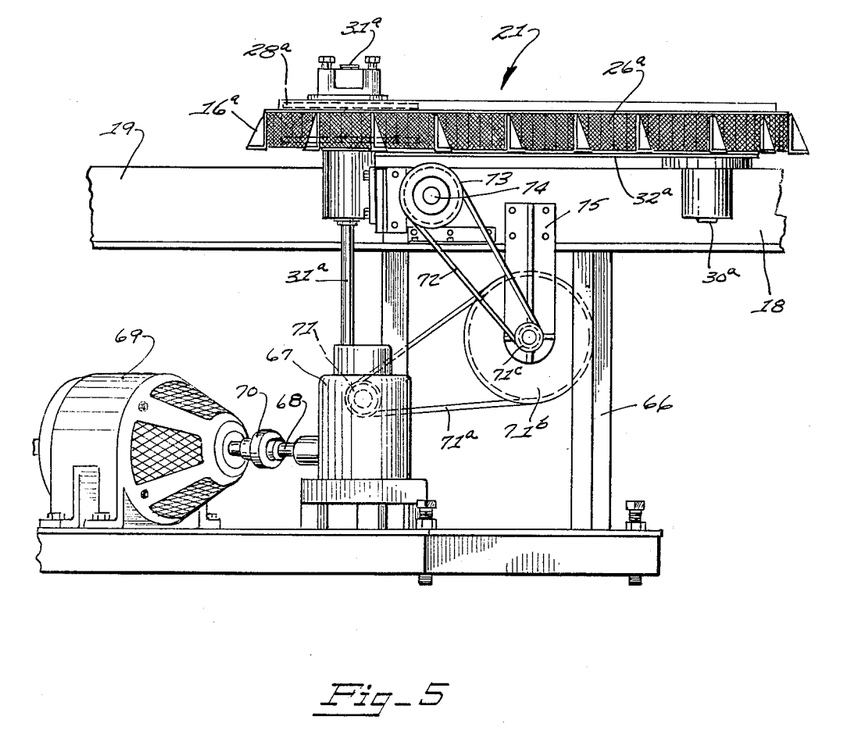
Fig. 5 is a side elevational view of the primary transfer mechanism, shown on Fig. 3.

Referring to Fig. 5, the secondary transfer element 21 is supported by its frame 66 resting on the floor of the factory. The driving sprocket 28a, which is receiving rotation to travel the transfer chain 26a, is driven through its vertical shaft 31a coupled to a gear transmission unit 67. The vertical shaft 31a then becomes the power output shaft of the transmission 67. The power input shaft 68 of the said transmission is connected to an electric motor 69 by a coupling 70. The electric motor 69 is a receiver motor of a synchro-tie system, the receiver motor being electrically tied to a transmitter motor driven by the main motor drive of the glass forming machine 10 (Fig. 1). Thus, the drive system for the secondary transfer element 21, which also drives the secondary conveyor 18, is synchronized to run with the primary conveyors, take-out mechanism 12 and the forming machine 10. The drive for the secondary conveyor 18 is taken off of transmission unit 67 at driving pinion 71 (shown dotted in Fig. 5). The drive pinion 71 transmits power through chain 71a driving speed reduction gears 71b and 71c, and chain 72, driving gear 73. Gear 73 is mounted on the outer end of the drive shaft 74 for the secondary conveyor 18. Shaft 74 carries a gear in mesh with the interior face of the conveyor mat (not shown) for propelling it in endless fashion. The speed reduction gear 71b and 71c are mounted to the frame of secondary conveyor 18 by brackets 75.

Figure 7:
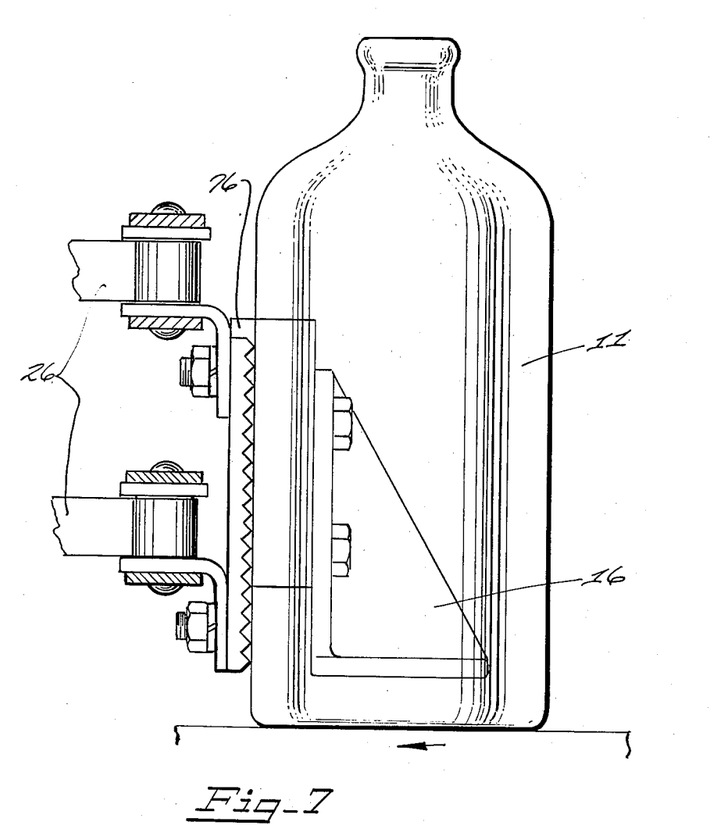
Fig. 7 is an enlarged side elevational view of one of the transfer fingers of the endless transfer belt engaged with the side wall of the container received thereagainst.

With reference to Fig. 7, article 11, in the form of a glass bottle, is shown nesting on a conveyor mat surface and is being supported from its trailing side and using sliding movement across the conveyor by a transfer finger 16. Transfer fingers 16 and 16a are identical castings. Accordingly, Fig. 7 illustrates the nesting relationship between an article. The transfer fingers 16 are bolted to a bracket 76 coupled to the pin connection on transfer chain 26 or 26a. The bracket 76 is thereby carried as part of the transfer chain 26. Transfer chain 26 and 26a are of like construction, the only difference being that in one case it is used with the primary transfer element 15 and in the other case used with the secondary transfer element 21.

Having now described one operative embodiment of the conveyor apparatus for this invention, it should be understood that various modifications may be resorted to, without departing from the principles of the invention, which are limited only by the scope of the claims.

I claim:

1. Conveyor apparatus for transporting a plurality of rows of articles deposited at the receiving end thereof to a singled row of articles at the unloading end comprising a plurality of side by side primary straight line conveyors, means for driving said primary conveyors at different lineal speeds, a secondary conveyor horizontally and angularly disposed with respect to the direction of movement of the primary conveyors and adapted to receive articles therefrom, article transfer means overlying said primary conveyors for intercepting articles traveling thereon and adapted for continuous movement in one direction to shift said articles from said primary conveyors to said secondary conveyor, said transfer means including spaced apart and vertically disposed members thereon adapted to engage and impel articles from the primary conveyors and propel said received articles toward the secondary conveyor, and driving means for actuating said article transfer means in synchronized movement with said means for driving the primary conveyors.

2. Conveyor apparatus for transporting a plurality of rows of articles deposited at the receiving end thereof to a singled row of articles at the unloading end comprising a plurality of parallel primary conveyors, means for driving said primary conveyors at progressively increased lineal speeds one from the other, an endless transfer chain overlying the said conveyors and arranged to travel in one direction angularly across each of said conveyors in a horizontal plane for intercepting articles carried thereon, vertically disposed outwardly projecting fingers spaced along the length of the said transfer chain adapted to engage the trailing side of articles received thereagainst, a straight-line secondary conveyor beginning in underlying alignment with the forward length of the transfer chain traversing said primary conveyors, said secondary conveyor adjoining the faster moving of the primary conveyors to provide a continuous path for travel of articles transferred by said fingers, and means for driving said transfer chain in synchronized relationship with said primary conveyors.

3. Conveyor apparatus for transporting glassware deposited thereon from a forming machine in pairs at its receiving end to a lehr apron, whereupon it is deposited in single-file, said apparatus comprising a pair of parallel primary conveyors adapted for travel at different lineal speeds, an endless primary transfer element traveling in one direction overlying said conveyors, a length of said primary transfer element traversing said conveyors at an obtuse angle thereto, means for driving said conveyors and said primary transfer element at lineal speeds having a predetermined ratio one to the other, a single straight line conveyor aligned substantially with the traversing length of the transfer element and extending from adjacent the faster moving primary conveyor to the lehr apron, a first transfer plate connecting the outer side of the faster moving primary conveyor and the beginning end of the secondary conveyor, a second transfer plate connecting the terminating end of the secondary conveyor and the lehr apron, a second endless transfer element adapted for travel in one direction in overlying relationship to the secondary conveyor, a length of said secondary transfer element being aligned for transfer of articles from the secondary conveyor across the second transfer plate and onto the adjacent end portion of the lehr apron, and means for driving said secondary conveyor and said second transfer element at traveling speeds having a predetermined ratio one to the other.

4. Apparatus defined in claim 3, wherein said primary and secondary transfer elements comprise an endless chain mounted to run on horizontally spaced sprockets, and a plurality of transfer fingers mounted at equally spaced distances on said chain to extend outwardly therefrom for engaging glassware carried within its reach by said primary conveyors, said fingers being adapted to push the glassware at its trailing side wall during transfer.

5. Apparatus defined in claim 4, wherein a fixed guide member is provided intermediate the sprockets of each of the primary and secondary transfer elements to engage the inner endless surface of each chain thereof, the said guide member associated with the primary transfer element defining the path of travel of the length of chain traversing the primary conveyors, and the said guide member associated with the secondary transfer element defining the path of travel of the length of chain for guiding transferred articles onto the said lehr apron.

6. Apparatus defined in claim 4, wherein the means driving the primary conveyors and primary transfer element comprises a driving gear at one end of each primary conveyor, said gears in mesh with the conveyor belt of its corresponding primary conveyor and having a different diametrical pitch, both said driving gears being mounted on a common rotatable shaft that is driven, thereby traveling each of said conveying surfaces of said primary conveyors at different lineal speeds, an electric motor, a driving connection between said rotatable shaft and the drive shaft of said motor, a vertical driven shaft drivably mounting one of the sprockets of said primary transfer element, and a driving connection between the drive shaft of said motor and said vertical driven shaft.

7. Apparatus defined in claim 6, wherein the driving connection from the motor to the vertical driven shaft comprises a differential gear reduction unit having a driving gear therein and mounted for rotation with a driven shaft receiving driving rotation from the motor, a driven shaft parallel to the drive shaft and having a driven gear mounted thereon, at least one rotatable idler gear having a mounting therefore adapted for rotation independent of said driving and driven shafts, said idlers in mesh with both driving and driven gears, a driving connection between the driven shaft and the vertical shaft mounting the drive sprocket for the primary transfer chain, and means in driving engagement with the idler gear mounting for rotating it in either direction to advance or retard the relative position of the driven shaft and correspondingly adjust the relative position of the transfer fingers of the primary transfer chain with respect to the path of travel of the articles carried on the primary conveyors.

8. Conveyor apparatus for combining two or more rows of articles into a single row of said articles comprising two or more primary conveyors arranged side-by-side, each carrying a row of said articles, a single straight-line secondary conveyor laterally adjacent one of said primary conveyors, an endless transfer element traversing the said primary conveyors, the forward traversing length thereof being in alignment with said secondary conveyor, said traversing length traveling across the said primary conveyors at an obtuse angle and in overlying relationship for intercepting the rows of articles carried by said primary conveyors and transferring them to the secondary conveyor, said transfer element including spaced transfer fingers attached and carried thereon, said transfer fingers projecting laterally outwardly from said element to engage the articles intercepted on said primary conveyors, said fingers being adapted to impel said engaged articles in transferring them to the secondary conveyor, means for driving the primary conveyors to travel towards said transfer means, the primary conveyors nearest said secondary conveyors actuated to run faster than the next nearest adjacent primary conveyor, and means for driving the transfer element to shift said intercepted articles onto said secondary conveyor in single file.

9. Apparatus defined in claim 8, wherein said means for driving the endless transfer element comprises a pair of horizontally spaced sprockets in driving engagement with said transfer element, a vertical drive shaft mounting one of said sprockets, a differential gear drive receiving rotation from the means driving the primary conveyors and imparting rotation to the vertical drive shaft of said sprockets, and means associated with said differential gear drive for advancing or retarding the relative rotational position of said driven sprocket to either advance or retard the location of the transfer fingers relative to the path of travel of the articles carried on the primary conveyors.

10. Apparatus for continuously transferring glass articles delivered in a plurality of rows from glass forming machinery to a single file row across a lehr entrance comprising means for delivering said articles at spaced intervals onto a plurality of parallel side-by-side conveyors, means for driving each said conveyor to carry the articles deposited thereon in rows, said means being characterized by the fact that successive conveyors of the said plurality thereof are driven at progressively faster lineal speeds, means for intercepting articles from each said conveyor at a point along the travel of said conveyors remote from the point for delivering the articles thereto, said last-mentioned means having spaced apart transfer members adapted to engage and impel the articles for transferring said intercepted articles laterally away from the direction of their travel on said plural conveyors and into a single file row on a single conveyor, said single conveyor being adapted to travel in a direction divergent from the direction of travel of the said plural conveyors, said single conveyor extending from a point adjacent the faster moving one of the plural conveyors at least to a point adjacent the lehr entrance, and means along the single conveyor and adjacent the lehr entrance for intercepting said last-mentioned single file of articles for placing them in a closed single file across the entrance of the lehr.

11. Apparatus defined in claim 10, where the means for intercepting articles carried on the parallel conveyors and transferring them onto the single conveyor comprises a traveling endless element having spaced transfer fingers carried thereon, said element running angularly across the said parallel conveyors in overlying relationship and at an obtuse angle thereto, so that, at the point of intercepting the articles thereon, the said traveling element and parallel conveyors travel angularly away from each other.

12. Apparatus defined in claim 10, wherein the means for intercepting the single file of articles on the single conveyor comprises a traveling endless element having spaced transfer fingers carried thereon, said element running angularly across the said single conveyor and in overlying relationship thereto, so that, at the point of intercepting the articles thereon, the said traveling element and the single conveyor travel angularly away from each other, the direction of travel of said traveling element at the point of interception, being parallel and in alignment along the lehr entrance.

References Cited in the file of this patent

UNITED STATES PATENTS

| | | |
|---|---|---|
| 2,389,696 | Stiles | Nov. 27, 1945 |
| 2,560,995 | Stiles | July 17, 1951 |